US008671396B2

(12) United States Patent
Wu et al.

(10) Patent No.: US 8,671,396 B2
(45) Date of Patent: Mar. 11, 2014

(54) DYNAMIC INTERFACE REDUCTION FOR SOFTWARE MODEL CHECKING

(75) Inventors: Ming Wu, Beijing (CN); Huayang Guo, Beijing (CN); Yi Yang, Beijing (CN); Gang Hu, Beijing (CN); Lintao Zhang, Beijing (CN); Lidong Zhou, Beijing (CN); Tisheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 30 days.

(21) Appl. No.: 13/118,489

(22) Filed: May 30, 2011

(65) Prior Publication Data

US 2012/0311542 A1    Dec. 6, 2012

(51) Int. Cl.
    *G06F 9/44* (2006.01)
(52) U.S. Cl.
    USPC ........... 717/128; 717/124; 717/127; 717/131; 717/135
(58) Field of Classification Search
    None
    See application file for complete search history.

(56) References Cited

U.S. PATENT DOCUMENTS

| | | | |
|---|---|---|---|
| 7,076,407 B2 | 7/2006 | Liu | |
| 2003/0004926 A1* | 1/2003 | Ben-David | 707/1 |
| 2004/0123254 A1* | 6/2004 | Geist et al. | 716/4 |
| 2006/0218534 A1 | 9/2006 | Kahlon et al. | |
| 2007/0011671 A1 | 1/2007 | Kahlon et al. | |
| 2007/0168730 A1* | 7/2007 | Memmi | 714/30 |
| 2007/0244942 A1* | 10/2007 | McCamant et al. | 707/206 |
| 2009/0282288 A1* | 11/2009 | Wang et al. | 714/37 |
| 2009/0326886 A1* | 12/2009 | Arbel et al. | 703/6 |
| 2010/0088681 A1* | 4/2010 | Wang et al. | 717/126 |
| 2010/0125832 A1* | 5/2010 | Prasad et al. | 717/124 |
| 2010/0131804 A1 | 5/2010 | DasBarman et al. | |
| 2010/0242029 A1* | 9/2010 | Tkachuk et al. | 717/135 |
| 2010/0305919 A1* | 12/2010 | Ganai et al. | 703/2 |

OTHER PUBLICATIONS

Alur, Rajeev, et al. "Partial-order reduction in symbolic state space exploration." Computer Aided Verification. Springer Berlin Heidelberg, 1997.*
Caselli, Stefano, Gianni Conte, and P. Marenzoni. "Parallel state space exploration for GSPN models." Application and Theory of Petri Nets 1995. Springer Berlin Heidelberg, 1995. 181-200.*
Knottenbelt, William, et al. "Probability, parallelism and the state space exploration problem." Computer performance evaluation. Springer Berlin Heidelberg, 1998. 165-179.*
Yang, et al., "Dynamic Path Reduction for Software Model Checking", Retrieved at <<http://www.cs.sunysb.edu/~grosu/ifm09s.pdf>>, vol. 5423, 2009.

(Continued)

*Primary Examiner* — Don Wong
*Assistant Examiner* — Adam Conkey
(74) *Attorney, Agent, or Firm* — Brian Haslam; Mike Allen; Micky Minhas (57) ABSTRACT

Architecture employs an iterative process that incrementally discovers inter-component interactions and explores local state spaces within each component. Thus, the architecture lazily constructs the behavior of the environment of a component in the target software system, and integrates the construction of the inter-component interactions with the model checking process itself, and hence, does not need to eagerly construct the interface process. Component-based state space reduction is applied during the exploration of the whole system. The architecture decomposes a target software system into a set of loosely coupled components where interactions between the components tend to be significantly simpler than interactions within each component. An iterative algorithm facilitates the component-based state space reduction, which is exponential, on the real large-scale software systems.

13 Claims, 10 Drawing Sheets

(56) References Cited

OTHER PUBLICATIONS

Schaefer, et al., "Compositional Reasoning in Model-Based Verification of Adaptive Embedded Systems", Retrieved at <<http://ieeexplore.ieee.org/stamp/stamp.jsp?arnumber=04685797 >>, Proceedings of the Sixth IEEE International Conference on Software Engineering and Formal Methods, Nov. 11, 2008.

Lumpe et al., "State Space Reduction Techniques for Component Interfaces", Retrieved at <<http://www.ict.swin.edu.au/personal/mlumpe/Pubs/CBSE08.pdf>>, Proceedings of the 11th International Symposium on Component-Based Software Engineering, 2008.

Berezin et al., "Compositional Reasoning in Model Checking", Retrieved at <<http://www.cs.cmu.edu/~emc/papers/Invited%20Journal%20Articles/Compositional%20Reasoning%20in%20Model%20Checking.pdf>>, Revised Lectures from the International Symposium on Compositionally: The Significant Difference, 1998.

Ball, et al., "The Slam Project: Debugging System Software via Static Analysis", Retrieved at <<http://www.cs.arizona.edu/classes/cs620/fall06/Papers/p1-ball.pdf>>, Proceedings of the 29th ACM SIGPLAN-SIGACT symposium on Principles of programming languages, vol. 37 No. 1, Jan. 2002.

Godefroid, Patrice, "Compositional Dynamic Test Generation", Retrieved at <<http://citeseerx.ist.psu.edu/viewdoc/download-?doi=10.1.1.84.655&rep=rep1&type=pdf>>, Proceedings of the 34th annual ACM SIGPLAN-SIGACT symposium on Principles of programming languages, vol. 42 No. 1, Jan. 17-19, 2007.

Burch, et al., "Symbolic Model Checking with Partitioned Transition Relations", Retrieved at <<http://repository.cmu.edu/cgi/viewcontent.cgi?article=1440&context=compsci>>, Aug. 1, 1991.

Clarke, et al., "A Tool for Checking ANSI-C Programs", Retrieved at <<http://citeseerx.ist.psu.edu/viewdoc/download;jsessionid=1165C97AAF0DE416537F2324B5EBF575?doi=10.1.1.84.7887&rep=rep1&type=pdf>>, In Tools and Algorithms for the Construction and Analysis of Systems, 2004.

Clarke, et al., "Compositional Model Checking", Retrieved at <<http://citeseerx.ist.psu.edu/viewdoc/download?doi=10.1.1.111.7245&rep=rep1&type=pdf>>, Proceedings of Fourth IEEE Annual Symposium on Logic in Computer Science, Apr. 19, 1989.

Cook, et al., "Termination Proofs for Systems Code", Retrieved at <<http://citeseerx.ist.psu.edu/viewdoc/download?doi=10.1.1.61.3197&rep=rep1&type=pdf>>, Proceedings of the 2006 ACM SIGPLAN conference on Programming language design and implementation, vol. 41 No. 6, Jun. 11-14, 2006.

Corbett, et al., "Bandera: Extracting Finite-state Models from Java Source Code", Retrieved at <<http://santos.cis.ksu.edu/bandera/papers/bandera.pdf>>, Proceedings of the 2000 International Conference on Software Engineering, 2000.

Flanagan, et al., "Dynamic Partial Order Reduction for Model Checking Software", Retrieved at <<http://slang.soe.ucsc.edu/cormac/papers/popIO5.pdf>>, Proceedings of the 32nd ACM SIGPLAN-SIGACT symposium on Principles of programming languages, vol. 40 No. 1, Jan. 12-14, 2005.

Godefroid, et al., "Model Checking for Programming Languages using Verisoft", Retrieved at <<http://citeseerx.ist.psu.edu/viewdoc/download?doi=10.1.1.25.8581&rep=rep1&type=pdf>>, Proceedings of the 24th ACM SIGPLAN-SIGACT symposium on Principles of programming languages, 1997.

Graf, et al., "Construction of Abstract State Graphs with PVS", Retrieved at <<http://www-verimag.imag.fr/~graf/PAPERS/GrafSaidi97.pdf>>, Proceedings of the 9th International Conference on Computer Aided, 1997.

Grumberg, et al., "Model Checking and Modular Verification", Retrieved at <<http://citeseerx.ist.psu.edu/viewdoc/download-?doi=10.1.1.29.6959&rep=rep1&type=pdf>>, ACM Transactions on Programming Languages and Systems, vol. 16 No. 3, Aug. 15, 1991.

Henzinger, et al., "Lazy Abstraction", Retrieved at <<http://mtc.epfl.ch/~tah/Publications/lazy_abstraction.pdf>>, Proceedings of the 29th ACM SIGPLAN-SIGACT symposium on Principles of programming languages, Jan. 16-18, 2002, pp. 13.

Ip, et al., "Better Verification through Symmetry", Retrieved at <<http://citeseerx.ist.psu.edu/viewdoc/download?doi=10.1.1.49.9236&rep=rep1&type=pdf>>, Formal Methods in System Design—Special issue on symmetry in automatic verification, vol. 9 No. 1-2, Aug. 1996.

Killian, et al., "Life, Death, and the Critical Transition: Finding Liveness Bugs in Systems Code", Retrieved at <<http://www.usenix.org/event/osdi06/posters/killian.pdf>>, Proceedings of the 4th USENIX Symposium on Networked Systems Design and Implementation, 2007.

Lamport, Leslie, "The Part-time Parliament", Retrieved at <<http://citeseerx.ist.psu.edu/viewdoc/download?doi=10.1.1.136.2896&rep=rep1&type=pdf>>, ACM Transactions on Computer Systems, vol. 16 No. 2, May 1998.

Laster, et al., "Modular Model Checking of Software", Retrieved at <<http://citeseerx.ist.psu.edu/viewdoc/download?doi=10.1.1.51.8952&rep=rep1&type=pdf>>, Jul. 17, 1997.

Mattern, Friedemann, "Virtual Time and Global States of Distributed Systems", Retrieved at <<http://citeseerx.ist.psu.edu/viewdoc/download?doi=10.1.1.47.7435&rep=rep1&type=pdf>>, Proceedings of the International Workshop on Parallel and Distributed Algorithms, 1989.

Musuvathi, et al., "CMC: A Pragmatic Approach to Model Checking Real Code", Retrieved at <<http://citeseerx.ist.psu.edu/viewdoc/download?doi=10.1.1.20.2218&rep=rep1&type=pdf>>, Proceedings of the 5th symposium on Operating systems design and implementation,vol. 36, Dec. 2002.

Musuvathi, et al., "Iterative Context Bounding for Systematic Testing of Multithreaded Programs", Retrieved at <<http://research.microsoft.com/pubs/70405/tr-2007-14.pdf>>, Proceedings of the 2007 ACM SIGPLAN conference on Programming language design and implementation, vol. 42 No. 6, Jun. 2007.

Touati, et al., "Implicit State Enumeration of Finite State Machines using BDD's", Retrieved at <<http://www.eecs.berkeley.edu/~alanmi/courses/2005_290A/papers/iccad1990.pdf>>, Proceedings of IEEE International Conference on Computer-Aided Design, Digest of Technical Papers, Nov. 11-15, 1990.

Visser, et al., "Model Checking Programs", Retrieved at <<http://www.visserhome.com/willem/papers/ase00FinalJournal.pdf>>, vol. 10 No. 2, Apr. 19, 2002.

Yang, et al., "MODIST: Transparent Model Checking of Unmodified Distributed Systems", Retrieved at <<http://www.usenix.org/event/nsdi09/tech/full_papers/yang/yang.pdf>>, Proceedings of the 6th USENIX symposium on Networked systems design and implementation, 2009.

Yang, et al., "Explode a Lightweight, General System for Finding Serious Storage System Errors", Retrieved at <<http://www.stanford.edu/~engler/explode-osdi06.pdf>>, Proceedings of the 7th USENIX Symposium on Operating Systems Design and Implementation, vol. 7, 2006.

Yang, et al., "Using Model Checking to Find Serious File System Errors", Retrieved at <<http://www.stanford.edu/~engler/osdi04-fisc.pdf>>, ACM Transactions on Computer Systems, vol. 24 No. 4, Nov. 2006.

\* cited by examiner

DYNAMIC INTERFACE REDUCTION FOR SOFTWARE MODEL CHECKING

BACKGROUND

Complete verification of system implementations is a daunting task, if not infeasible for complex real-world systems. Software model checking directly model checks the implementation of a target system, and hence, avoids the error-prone phase of transforming the system implementation into the abstract model. Software model checking is able to find some rare bugs for some existing software systems. However, the large scale software systems (e.g., distributed systems) tend to be complicated and lead to a huge state space for a software model checker to explore. Thus, state space explosion is a major obstacle to the effectiveness of these model checkers.

Compositional reasoning techniques have been proposed to mitigate the state space explosion problem by decoupling the complex software system into components and eagerly construct interface processes to simulate behaviors of the environment for each component. With interface process, it model-checks each component respectively to make sure that it satisfies some properties, and then borrows human effort to reason the correctness of the whole system that includes these components. Unfortunately, the construction of interface process is not practical for real complex software system. The needs for human interference also decrease the effectiveness of such techniques significantly.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs an iterative process that incrementally discovers inter-component interactions and explores local state spaces within each component. Thus, the architecture lazily constructs the behavior of the environment of a component in the target software system, and integrates the construction of the inter-component interactions with the model checking process itself, and hence, does not need to eagerly construct the interface process. Component-based state space reduction is applied during the exploration of the whole system. The architecture decomposes a target software system into a set of loosely coupled components where interactions between the components tend to be significantly simpler than interactions within each component. An iterative algorithm facilitates component-based state space reduction, which is exponential, on the real large-scale software systems.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture, referred to as dynamic interface reduction (DIR), decomposes a target software system into a set of loosely coupled components, where interactions between components tend to be significantly simpler than interactions within each component. It avoids the conventional operations of repeated local state space exploration within a component when different global system behaviors map to the same local behavior for the component, since these global system behaviors contain the same interactions between the component and the rest of the system.

The disclosed architecture enhances software model checking by employing DIR, a state-space reduction technique, introducing a framework that enables DIR in an existing model checker with minimal effort, and providing the framework with a distributed runtime engine that supports parallel distributed model checking.

A target software system is considered as comprising a set of components, each with a well-defined interface with the remainder of the system. The DIR is a state-space reduction technique for software model checking based on the following observations: (i) given the interface behavior between components, model checking each component separately becomes feasible and is often more effective than exploring the global state-space of the original system, and (ii) interface behavior between components can be discovered dynamically during state-space exploration. The architecture includes an algorithm that progressively explores the local state-space of each component, while discovering interface behaviors between components.

The architecture adopts a modular design as a framework to enable DIR in existing model checkers with little engineering effort. Specifically, a set of common data structures and APIs (application program interfaces) are provided to encapsulate the implementation details of an existing model checker. The DIR algorithms can then be implemented independently of any specific model checker and is accordingly reusable.

The architecture implements a distributed runtime for DIR-enabled model checking that leverages the inherent parallelism in the DIR algorithms, as component-local explorations with respect to given interface behaviors are largely independent. Thus, scaling can be performed over multiple machines, and any distributed system or cloud infrastructure can be employed to further enhance model checking capabilities.

Dynamic interface reduction operates on componentization, where a system consists of a set of components, each with a well-defined interface to interact with the rest of the system. For example, a distributed system can have processes running on each machine as a component, with message send and receive between machines as interface behavior between components. State-space exploration is then divided into a set of local explorations, one for each component, and a global exploration that explores the interactions between components. The interface behavior is then tracked and built up between each component and the rest of the system. Dynamically discovering interface behavior removes the need for users to model interactions beforehand and follows closely the philosophy of implementation-level model checking with no specification or modeling.

As an analogy, a set of interface behaviors works like a (result) cache for both local explorations and global exploration. For a local exploration, either the exploration hits behavior described in the "cache", in which case it continues by simulating what the rest of the system does from that "cache", or the exploration creates a different behavior, leading to a "cache miss" and causing global exploration to take the new behavior and figure out how the rest of the system behaves (and fill the "cache"). Similarly, the global exploration does not explore the state-space within a component: either it follows a known interface behavior, whose local behavior is being explored by a local explorer, or it detects a new interface behavior, leading to a "cache miss" and causing local explorers to figure out how to respond to the new behavior (and fill the "cache"). This way, local and global explorations gradually converge to the complete interface behavior cooperatively while exploring the system's state space systematically.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
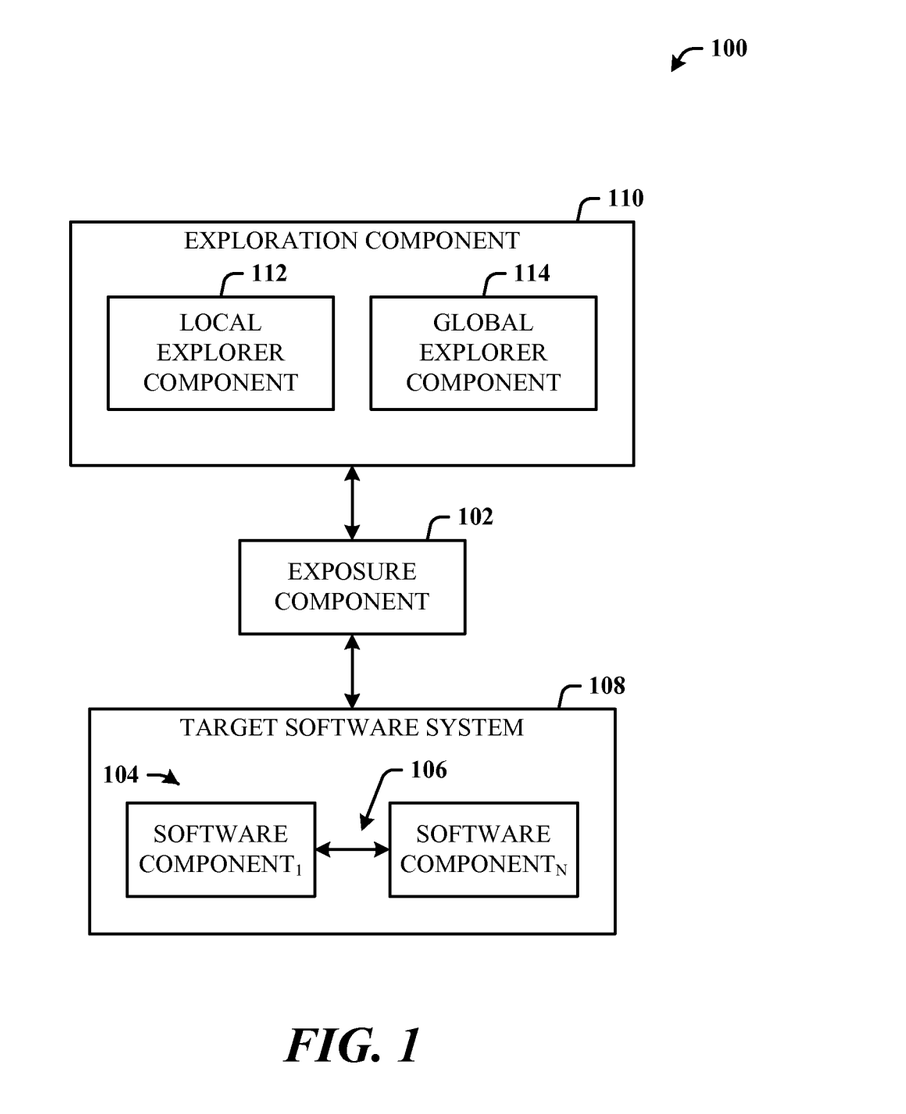
FIG. 1 illustrates a model checker framework in accordance with the disclosed architecture.

FIG. 1 illustrates a model checker framework 100 in accordance with the disclosed architecture. The framework 100 includes an exposure component 102 that exposes underlying software components 104 and associated well-defined interfaces 106 of a target software system 108, and an exploration component 110 that dynamically performs state-space exploration of the target software system 108 to discover state space associated with the software components 104, to detect software defects.

The exploration component 110 performs the state-space exploration iteratively. The exploration component 110 discovers a local state space of each software component using a single-component simulation process. The exploration component 110 discovers a global state space of interactions between the software components 104 a using composition-by-substitution process. In fact, the exploration component 110 dynamically discovers all interactions between underlying software components 104. The exploration component 110 includes a local explorer component 112 and a global explorer component 114, the local explorer component 112 reports newly discovered branching traces to the global explorer component 114. The exploration component 110 includes the local explorer component 112 and the global explorer component 114. The global explorer component 114 discovers and projects new global traces to the local explorer component 112. The exposure component 102 and the exploration component 110 are employed with a model checker. The exploration component 110 discovers local state space and global state space concurrently.

Figure 2:
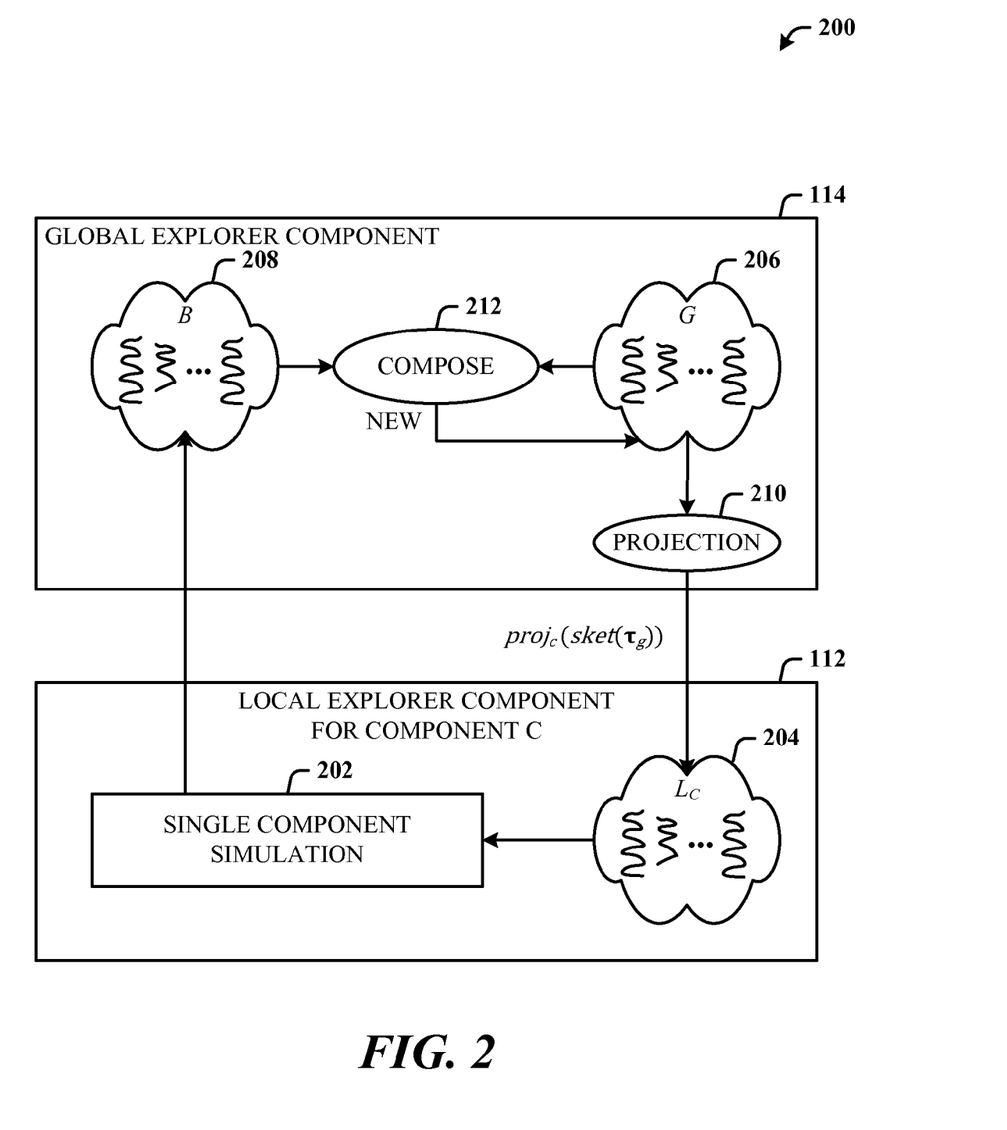
FIG. 2 illustrates a system that depicts interactions between the global explorer component and local explorer component.

FIG. 2 illustrates a system 200 that depicts interactions between the global explorer component 114 and local explorer component 112. The DIR algorithm comprises two cooperative progressive tasks that run concurrently. The local explorer component 112 (also denoted LocalExplorer) explores the local state space of each software component using single-component simulation 202, and maintains a set 204 (denoted $L_c$) of local skeletons for each component C and runs the simulation 202 against the set 204. The local explorer component 112 reports newly discovered branching traces $\tau$ to the global explorer component 114. The global explorer component 114 discovers all global skeletons, and maintains a set 206 (also denoted G) of global skeletons with representative global traces, as well as a set 208 (also denoted B) of branching traces discovered by the local explorer component 112. The global explorer component 114 uses composition by substitution to discover new global traces and projects those to new local skeletons using projection 210. A new local skeleton for C is then sent to the corresponding local explorer component 112 and added to its set 204 of local skeletons $L_c$.

The algorithm starts by a random global execution to initialize the set 206 with some global skeletons and associated global traces. Formally, the algorithm upholds soundness and completeness. Soundness requires that every local trace explored by the algorithm is part of a valid global trace, while completeness states that any global skeleton is discovered by the algorithm, that any possible local trace in the system is covered by the algorithm, and that every global trace can be composed from explored local traces in a compose process 212.

Following are steps associated with the explorer components (112 and 114).

Local explorer component 112.
1. For each component C, model check the single-component simulation system of C against each local skeleton in $L_c$.
2. For any branching trace Tb discovered during single-component simulation, add $\tau_b$ to B.

Global explorer component 114.
1. For any global skeleton $k_g$ and associated global trace $\tau_g$, such that $(k_g, \tau_g) \in G$, and any branching trace $\tau_b \in B$ that is produced during the single-component simulation under the local skeleton $k_c = Proj_c (k_g)$ for component C, compute $\tau'_g = compose\ (\tau_g, \tau_b)$.
2. If composition is successful, compute $k'_g = sket(\tau'_g)$; otherwise, continue the loop in the first step until reaching a fixed point.
3. If no entry with the same global skeleton $k'_g$ already exists in G, add $(k'_g, \tau'_g)$ to G and, for each component C, compute $k'_c = Proj_c (k'_g)$ and add $k'_c$ to $L_c$.
4. Continue the loop in the first step until reaching a fixed point.

Figure 3:
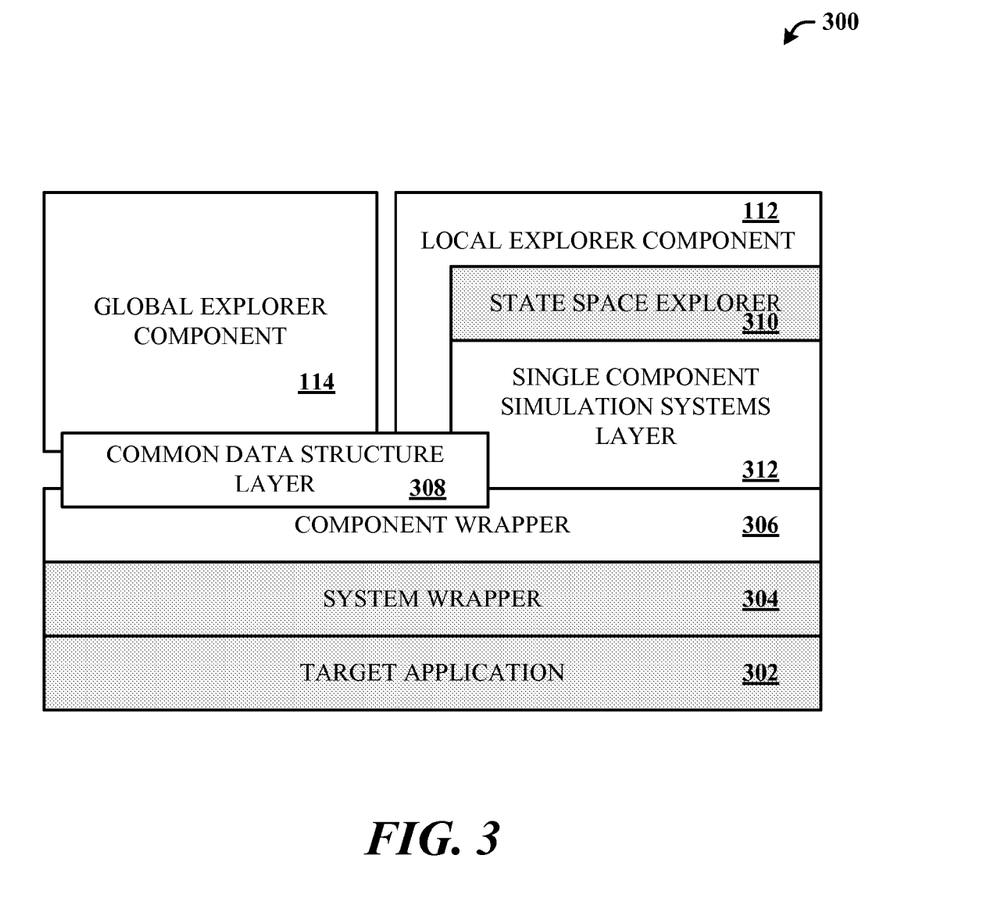
FIG. 3 illustrates a layered architecture that employs dynamic interface reduction for a model checker.

FIG. 3 illustrates a layered architecture 300 that employs dynamic interface reduction for a model checker. The disclosed architecture provides a "caching layer" along component interfaces and is largely independent from the model-checking and other state-space reduction techniques. The architecture 300 is a model checking framework, which can embed an existing software model checker in order to enable dynamic interface reduction for that model checker.

The architecture 300 includes the target system 108 (application 302) and a system wrapper 304. Overlying the system wrapper 304 is a component wrapper 306. A common data structure layer 308 provides an interface between the component wrapper 306 and, the global explorer component 114 and the local explorer component 112. The local explorer component 112 comprises a state space explorer 310, and single component simulation systems layer 312.

The embedded model checker is denoted herein as eMC. The shaded rectangles (302, 304, and 310) correspond to the layering in the embedded model checker eMC. These modules (system wrapper 304 and state-space explorer 310) are unmodified. In particular, the model checking framework utilizes eMC's state-space explorer 310 because the explorer 310 adds the single-component simulation layer 312 that gives the state-space explorer 310 an illusion of a stand-alone complete system just as the original application. The single-component simulation layer 312 further uses the component wrapper 306, which defines component boundaries and interface transitions. To isolate the specific implementation details of the eMC, the framework defines a common set of data structures/API and implements the common data structure layer 308 that converts between these data structures and those used in eMC. Consequently, the global explorer component 114 and the part of local explorer component 112 built on top of the common data structure layer 308 are reusable across different eMCs.

The framework builds a single-component simulator by reusing eMC's state-space explorer 310 and system wrapper 304. The single-component simulator takes a component, a local skeleton and a corresponding global trace $\tau$, and runs the entire system on the original system wrapper, except that the simulator checks whether a transition is local to the component or not (provided by the component wrapper 306) and replays any transitions in other components following $\tau$. Only transitions in the current component are exposed to eMC's state-space explorer.

An alternative design replays only the interface transitions from other components during single-component simulation.

The global explorer component 114 is built on a small set of common data structures and APIs of the common data structure layer 308. In particular, the basic concurrency unit of a system can be modeled as a thread. A transition is represented by a simple data structure with the following core fields: (i) the thread identifier, (ii) unique identifier, (iii) vector clock, (iv) interface transition flag, and (v) additional information about the transition. The additional information is mainly for converting this data structure to any original trace representation in eMC. A trace is defined as a set of transitions organized by the associated partial order (according to vector clocks). A skeleton is defined as a kind of trace that contains only interface transitions. Common operations can be defined on those data structures, such as projection from global trace to local trace, extraction of interface skeleton from a trace, and composition of a branching trace and a global trace. All of these operations are independent from eMC.

The following core functions can be implemented on top of eMC's system wrapper 304 for the global explorer component 114: (i) reset system to the initial state, (ii) execute a particular transition at the current trace prefix, and (iii) run a trace prefix to completion (with a randomly selected enabled transition in each step). For the local explorer component 112, the single-component simulation also provides a simple API to set up and run a simulation with respect to a given local skeleton. Implementing global explorer component 114 and part of the local explorer component 112 on this set of common data structures and APIs makes its core logic reusable as it is made independent from eMC. The common data structure layer 308 is responsible for providing the data-structures and the APIs.

Interface equivalence defined on the equality of two skeletons is a core concept in the framework and is widely used in the implementation of dynamic interface reduction. For example, a LocalExplorer (the local explorer component 112) checks equality between branching traces and local skeletons so that it can decide whether an encountered branching trace or local skeleton is new or not; when performing composition, the GlobalExplorer (the global explorer component 114) also checks whether prefixes of two traces are interface equivalent.

Interface equivalence can be assessed by comparing interface transitions in skeletons. An interface transition in a skeleton is identified through the following four properties: (i) the component to which the skeleton belongs, (ii) the communication object the skeleton accesses, (iii) the skeleton operation and arguments (e.g., a send operation with its message content), and (iv) partial order information. Partial-order information can be expressed in vector clocks that capture not only happen-before relations in a concurrent/distributed system, but also dependencies between conflicting transitions. For example, conflicting accesses to a shared object are captured by tracking the vector clock on the last access to a shared object and making sure that a later conflicting access will take that into account when creating its own vector clock value.

To expedite frequently-used interface-equivalence checking, the framework first imposes the same canonical representation on partial-order equivalent skeletons and computes a signature for a skeleton by applying a hash on that canonical representation. The equality of two skeletons is then the same as the equality of the associated signatures.

The framework computes a skeleton vector clock from the original to remove the effects of internal events and adjusts the vector clock values of each interface transition accordingly.

The framework enables parallelism. Model checking involves a GlobalExplorer and a set of LocalExplorers, one for each component. Each LocalExplorer is responsible for one component of the model checked system and has no direct interactions with others. For each local skeleton of the component, the LocalExplorer starts an MC Worker that performs single-component simulation and exploration for that component with respect to that local skeleton. An MC Worker reports any branching trace discovered during local exploration. MC Workers do not need inter-worker synchronizations and can run in parallel. In one example, a distributed runtime can be one machine that serves as the GlobalExplorer, monitors the active tasks in the runtime, and dispatches LocalExplorers and MC Workers.

The GlobalExplorer is the only major centralized task in the execution flow of the framework as it manages the set of discovered branching traces and the set of known global skeletons, performs composition between each pair of branching trace and global skeleton in those two sets, and sends new local skeletons to LocalExplorers. The framework employs a global random-exploration task to find new global and local skeletons for LocalExplorers when the GlobalExplorer cannot keep up. Random exploration is efficient in detecting new skeletons at the initial phase and activates whenever resources are available because of insufficient parallelism in the system. Available resources can also be used to offload work from the GlobalExplorer, since composition and projection are easily processed in parallel.

All state changes on the GlobalExplorer are logged and persisted so that the explorer can be re-started after a failure that may occur. No replication is enabled, although this can be implemented. Since the GlobalExplorer checks whether a reported branching trace is new, having duplicate branching traces sent to the GlobalExplorer is acceptable. As a result, any MC Worker can be restarted without causing any correctness problem. In the worst case, an MC Worker can be re-started (possibly on a different machine) and the previously explored local state-space would be re-explored. Since the MC Worker uses an existing model checker for local exploration, its ability to re-start from failure is determined by that underlying model checker. Each MC Worker can utilize a checkpoint/recovery mechanism in the underlying model checker to avoid redundant exploration due to failures. The framework can be integrated with existing model checkers.

The effectiveness of DIR can be based on how a target system is partitioned into components. One way is to make each process a component. This approach is effective since processes in a distributed system tend to communicate with each other through message passing, where the design tends to minimize communication between them for performance reasons. Application logic within a process is often implemented with multi-threads and asynchronous I/O (input/output) for high performance, which introduces substantial sources of non-determinism. Therefore, interactions between processes can be significantly simpler than non-determinism within each process, which leads to significant reduction.

It is also possible to group multiple processes together to form a component. Even with processes running the same code, different groupings often have different effects, due to different roles the processes play in an application. For example, in dining philosophers, it makes sense to group consecutive philosophers together because doing so will lead to an interface with only two forks no matter how many philosophers are included in that component. In the worst case, if philosophers are divided into two components in alternation, all forks will become interface objects.

The decision of whether certain processes should be grouped together as one component can be based on several factors. Tightly coupled processes can be grouped together, although this may increase the complexity of a single-component simulation. When the number of components is high, the overhead on GlobalExplorer also increases as the number of global skeletons increases. To address this increase, a hierarchical dynamic interface reduction algorithm is employed to reduce the overhead on GlobalExplorer by recursively dividing a system into a small number of components at each level.

Not only can the framework discover local assertion failures and misbehavior during state-space exploration, but also can be used to check global safety properties. One place to perform global property checking is at the GlobalExplorer as it has a global view on a system via global skeletons and global traces. To facilitate global property checking, each component exposes not only interface transitions but also any local states that are referenced by the specified global property. Updates to local variables referenced are reported. Those states are taken into account when assessing whether an execution creates a branching trace, although local skeletons for LocalExplorers do not have to contain such states because they are not used in single-component simulation. All such information is incorporated into global skeletons during the composition process. The GlobalExplorer then can enumerate all the consistent snapshots of those state variables on all the global skeletons to check global properties.

With respect to branching redundancy, the framework builds a single-component simulation system for each local skeleton. A branching trace is not part of a local state space, but can be counted as overhead for local exploration. To avoid the effects of redundancy in possibly exploring a branching trace multiple times, the exploration can be accelerated by parallelizing the exploring algorithm itself. For example, it is possible to have a different worker exploring a sub-tree space of a particular local-state simulation system.

Following is a description of a system model. When considering a concurrent/distributed system, a system starts from an initial state and at each step performs a transition into the next state, where there can be multiple enabled transitions at any step. The environment is used to model the nondeterminism as different choices of enabled transitions that cause a system to enter different states. Such nondeterminism includes thread/process scheduling, message ordering, timer, failures, and other randomness in the system.

Implementation-level software model checkers work directly on actual implementations of target systems and typically consists of two major pieces. The first is a system wrapper that exposes an underlying system and enables the control of non-determinism in the environment. The second is an exploration mechanism that builds on top of the system wrapper to explore the system state space by capturing and controlling nondeterminism in order to find software defect such as unintended exceptions and crashes, assertion failures, and other safety violations.

Two transitions are dependent if one can enable or disable the other, or if executing the transitions in a different order leads to a different state. For example, two lock operations on the same lock, a write operation and read/write operations on the same shared variable, and a message send and corresponding receive operations, are dependent. Starting from an initial state, a system execution is modeled as a trace that captures all transitions taken by the system and the partial order between those transitions based on transition dependencies. Partial-order equivalent traces are considered the same.

The target software system is divided into a static set $\mathcal{C}$ of components. Components interact with each other through interface objects, such as communication channels or shared objects. Transitions are classified as internal if the transitions do not read or write interface objects, or interface if the transitions access and/or update interface objects. An interface transition is further an output transition if it updates an interface object (e.g., sending a message or updating a shared object), or an input transition if it reads an interface object (e.g., receiving a message or reading a shared object).

Each transition belongs to a particular component. A global trace $\tau$ can be projected onto a component C by preserving only transitions that belong to component C and output transitions from other components to C, along with the associated partial order. The result is referred to as $proj_c(\tau)$. A skeleton can be extracted from a trace $\tau$ by keeping only interface transitions and their partial order in the trace. The resulting skeleton is referred to as $sket(\tau)$. A skeleton captures behavior at the interface and is tracked in the "result cache" in the above caching analogy.

Figure 4:
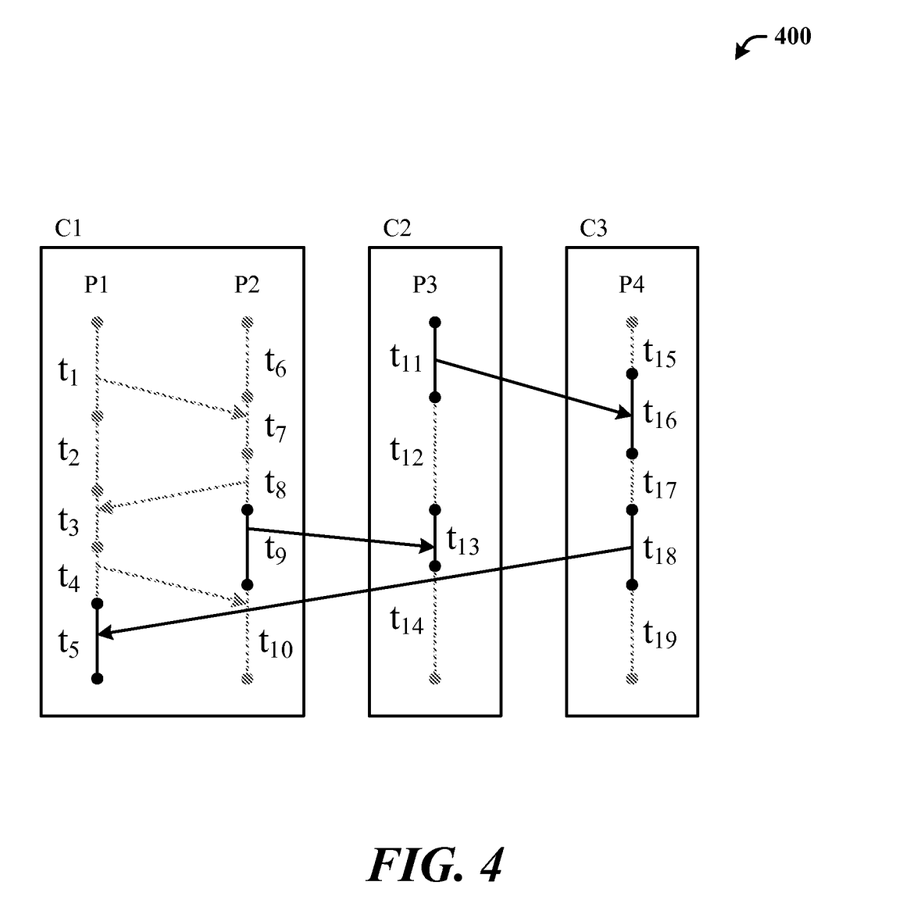
FIG. 4 illustrates an example trace of a concurrent system with four processes divided into three components.

FIG. 4 illustrates an example trace of a concurrent system 400 with four processes (P1 to P4), divided into three components (C1 to C3). Each segment corresponds to a transition ($t_1$ to $t_{19}$), while arrows represent inter-process communication. A partial order ($\leq$) is defined between transitions in the same process (assuming each process has a single thread), between a send transition and its corresponding receive transition, and is transitive. For example, $t_1 \leq t_2$, $t_8 \leq t_3$, and $t_9 \leq t_{13}$. Interface transitions (marked in bold) include $t_5$, $t_9$, $t_{11}$, $t_{13}$, $t_{16}$, and $t_{18}$. The corresponding global skeleton contains those interface transitions and the partial order as in the original trace. A projection to component $C_1$ contains all transitions ($t_1$ to $t_{10}$) in $C_1$, as well as $t_{18}$. The corresponding local skeleton for $C_1$ contains only transitions $t_5$, $t_9$, and $t_{18}$.

As to the reduction in state spaces, consider a global skeleton $\tau$, let $n_c$ be the number of local traces for a component C that match $\tau$. The total number of those local traces on all components is $\Sigma_c \in n_c$, while the total number of global traces with global skeleton $\tau$ amounts to $\Pi_c \in n_c$. Rather than exploring all global traces, DIR explores all local traces, leading to reduction.

Dynamic interface reduction for a software model checker involves two types of agents: global explorers and local explorers. For each component of a target system, a local explorer exhaustively explores the component local state space with respect to discovered local skeletons through single-component simulation. The local explorer may detect new local skeletons (a "cache miss") during the exploration, and report the new local skeletons and corresponding local traces to the global explorer.

The global explorer discovers all the global skeletons between components via a composition by substitution process. When receiving a new local skeleton and the corresponding local trace reported by a local explorer of some component, the global explorer composes the local trace with the global traces of already-discovered global skeletons to produce new global and local skeletons (again "cache misses") using interface-equivalent substitution. The resulting local skeletons are then distributed to local explorers. Iterative executions of local and global explorers progressively discover all global and local skeletons, and explore the local state space of each component with respect to those local skeletons.

Single-component simulation explores a component's local state space with respect to its local skeletons. Components can interact and influence each other only through the associated interfaces. A local skeleton captures the interactions between its component and the rest of the system. Given a local skeleton, the component can execute in isolation without executing other components in the system. This can be achieved through simulating the influences of other components captured by the local skeleton using interface processes.

In a single component simulation for C, component C has the same local states and transitions as in the original system, while the interface process executes all other transitions based on the given local skeleton. Note that interface transitions simulated by the interface process are output transitions from the rest of the system on component C. Dependency relations among transitions in a local skeleton are preserved and can help decide when a transition in the interface process becomes enabled. When an enabled interface process transition is invoked, the interface process produces the same effect on the corresponding interface object as the real system environment of component C at that state: it behaves as if the rest of the system relative to component C is really executing.

A local exploration normally follows the interface transitions which form a prefix of the given local skeleton. However, local exploration might sometimes produce an output transition that deviates from the given local skeleton. This is an indication of the existence of global and local skeletons that are yet to be explored. Such a deviating output transition is called a branching transition, where the deviating trace is called a local branching trace.

Figure 5:
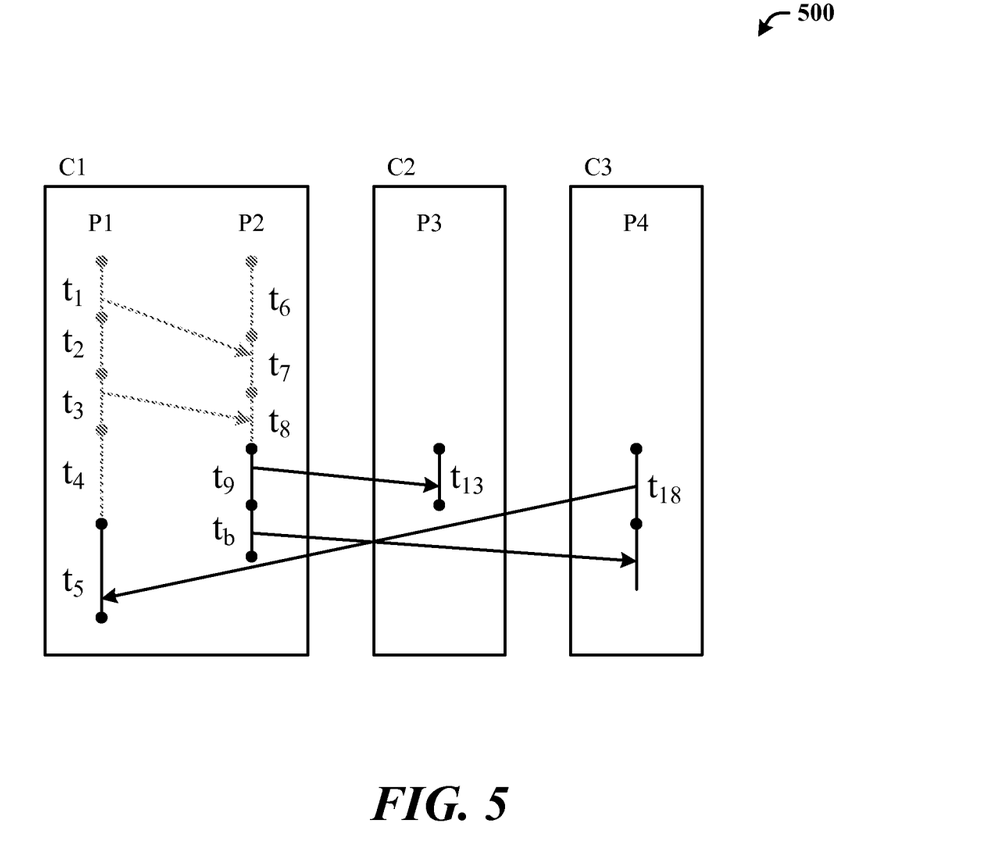
FIG. 5 illustrates a branching trace $\tau_b$ for the local skeleton of trace $\tau_A$ in FIG. 4 on component $C_1$.
Figure 6:
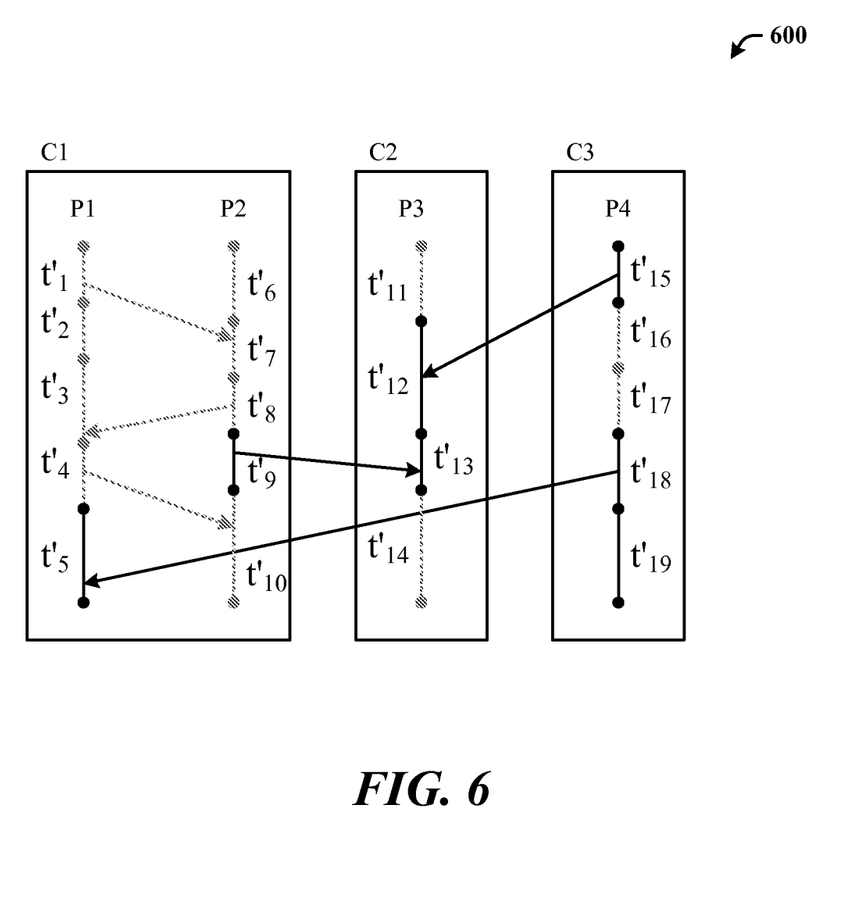
FIG. 6 illustrates a global trace with the same projected skeleton on component $C_1$ as $\tau_A$.
Figure 7:
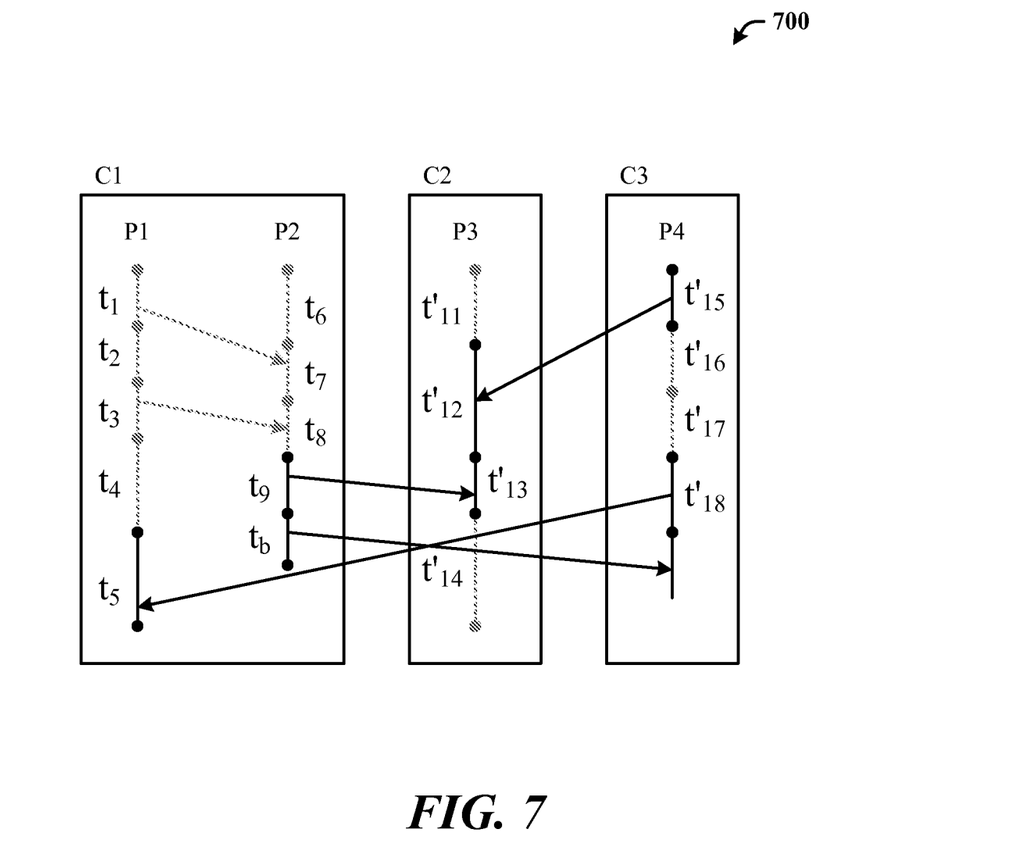
FIG. 7 illustrates the composition of branching trace $\tau_b$ and global trace $\tau_g$.

FIGS. 5-7 illustrate an example of composition when applied on branching traces. FIG. 5 illustrates a graph 500 for a branching trace $\tau_b$ for the local skeleton of trace $\tau_A$ in FIG. 4 on component $C_1$. Branching transition $t_b$ is the result of a different execution order between $t_3$ and $t_8$ (as $t_3$ and $t_8$ might be requesting the same lock on a shared object). (Here, $t_3$ and $t_8$ are two concurrent transitions that are conflicting and switching execution orders leads to different system behavior.)

With respect to composition by substitution, global exploration is responsible for discovering new global skeletons and performs composition by substitution with branching traces discovered in local explorations. Intuitively, the global exploration enumerates all global skeletons, where the branching transition could be enabled, and determines what new interface behavior ensues.

More formally, given a local branching trace $\tau_b$ with branching transition $t_b$ on component C and a global trace $\tau_g$, the composition integrates $t_b$ into $\tau_g$ to construct a new global trace with a new global skeleton via substitution. Substitution takes a global trace $\tau_g$ and an interface-equivalent local trace c in component C, where interface equivalence is defined as follows: $\tau_g$ and $\tau_l$ are interface equivalent if and only if $proj_c(sket(\tau_g)) = sket(\tau_l)$ holds. Intuitively, let $\mathcal{C} \backslash C$ be the part of the system excluding component C, the behavior of $\mathcal{C} \backslash C$ in trace $\tau_g$ matches the interface behavior assumed by $\tau_l$. For $\mathcal{C} \backslash C$, the behavior of C in $\tau_g$ and $\tau_l$ is identical. Therefore, substitution replaces all transitions made by C in $\tau_g$ with those in $\tau_l$. Due to interface equivalence, the resulting global trace $\tau'_g = subst(\tau_g, \tau_l)$ preserves the global skeleton of $\tau_g$ and is a valid global trace.

Following is a description of an entire process of composition. For a component C, consider the branching trace $\tau_b$ and its branching transition $t_b$. Let $\tau$ be $\tau_b$ without the branching transition $t_b$. Consider any global trace $\tau_b$ with a prefix $\tau_p$ that is interface equivalent with $\tau$ on C. Compute $\tau'_p = subst(\tau_p, \tau)$. Since $t_b$ is enabled in $\tau$, $t_b$ is also enabled in $\tau'_p$. Execute $t_b$ and then continue executing enabled transitions at random until new global trace $\tau'_g = compose(\tau_g, \tau_b)$. FIG. 6 illustrates a global trace 600 with the same projected skeleton on component $C_1$ as $\tau_A$. FIG. 7 illustrates the composition 700 of branching trace $\tau_b$ and global trace $\tau_g$. The result is the trace in FIG. 7, where branching transition $t_b$ is a valid new transition that leads to a new global skeleton.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 8:
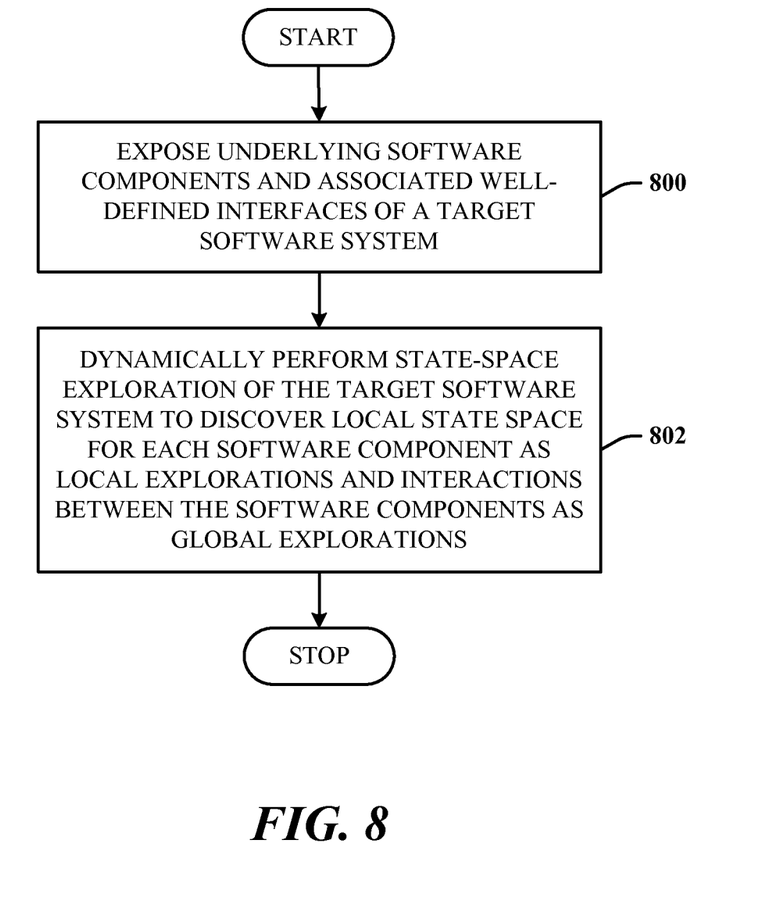
FIG. 8 illustrates a computer-implemented model checker method in accordance with the disclosed architecture.

FIG. 8 illustrates a computer-implemented model checker method in accordance with the disclosed architecture. At 800, underlying software components and associated well-defined interfaces of a target software system are exposed. At 802, state-space exploration of the target software system is dynamically performed to discover local state space for each software component as local explorations and interactions between the software components as global explorations.

Figure 9:
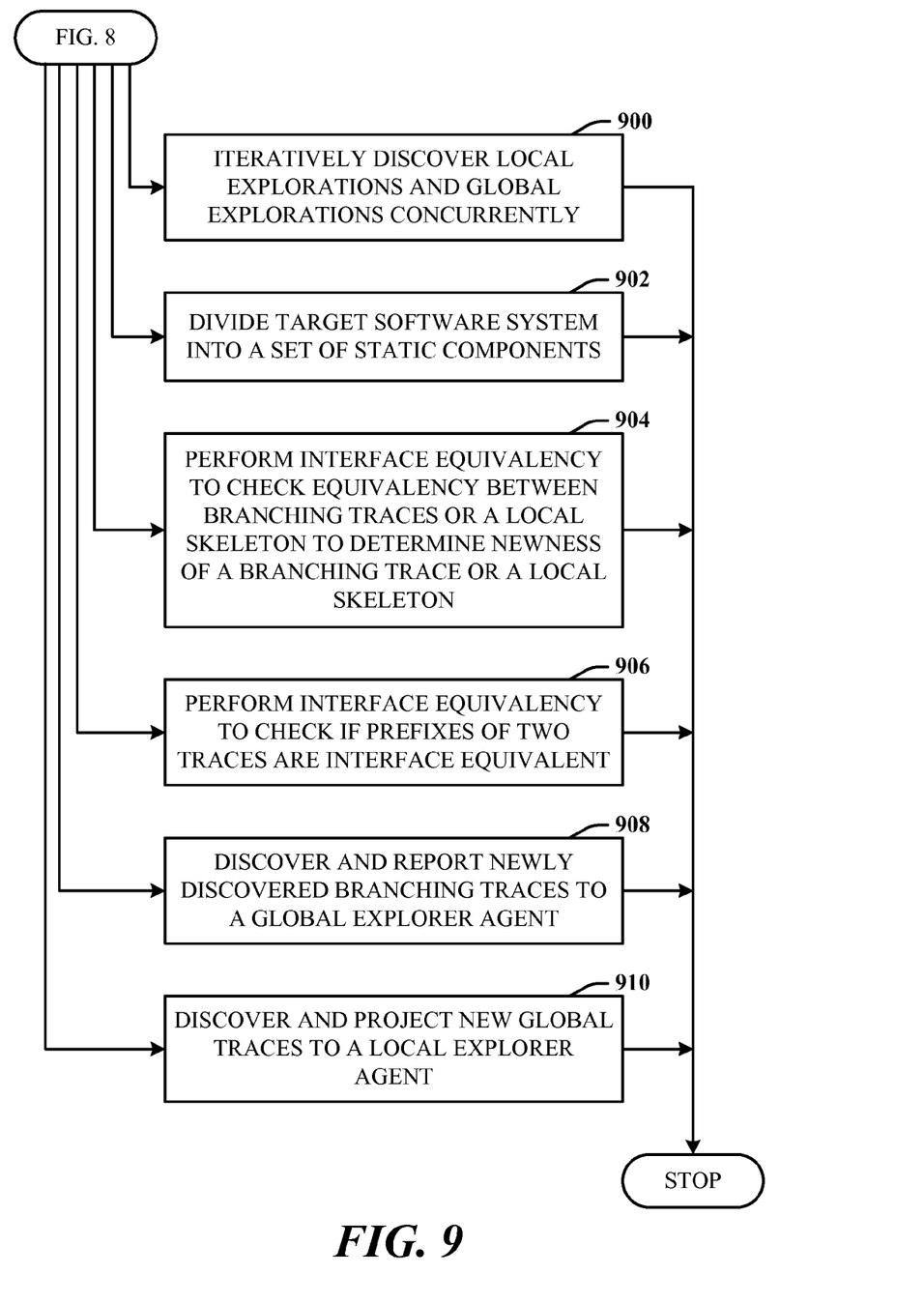
FIG. 9 illustrates further aspects of the method of FIG. 8.

FIG. 9 illustrates further aspects of the method of FIG. 8. Note that the flow indicates that each block can represent a step that can be included, separately or in combination with other blocks, as additional aspects of the method represented by the flow chart of FIG. 8. At 900, the local explorations and global explorations are iteratively discovered concurrently. At 902, the target software system is divided into a set of static components. At 904, interface equivalency is performed to check equivalency between branching traces or a local skeleton to determine newness of a branching trace or a local skeleton. At 906, interface equivalency is performed to check if prefixes of two traces are interface equivalent. At 908, newly discovered branching traces are discovered and reported to a global explorer agent. At 910, new global traces are discovered and projected to a local explorer agent.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 10:
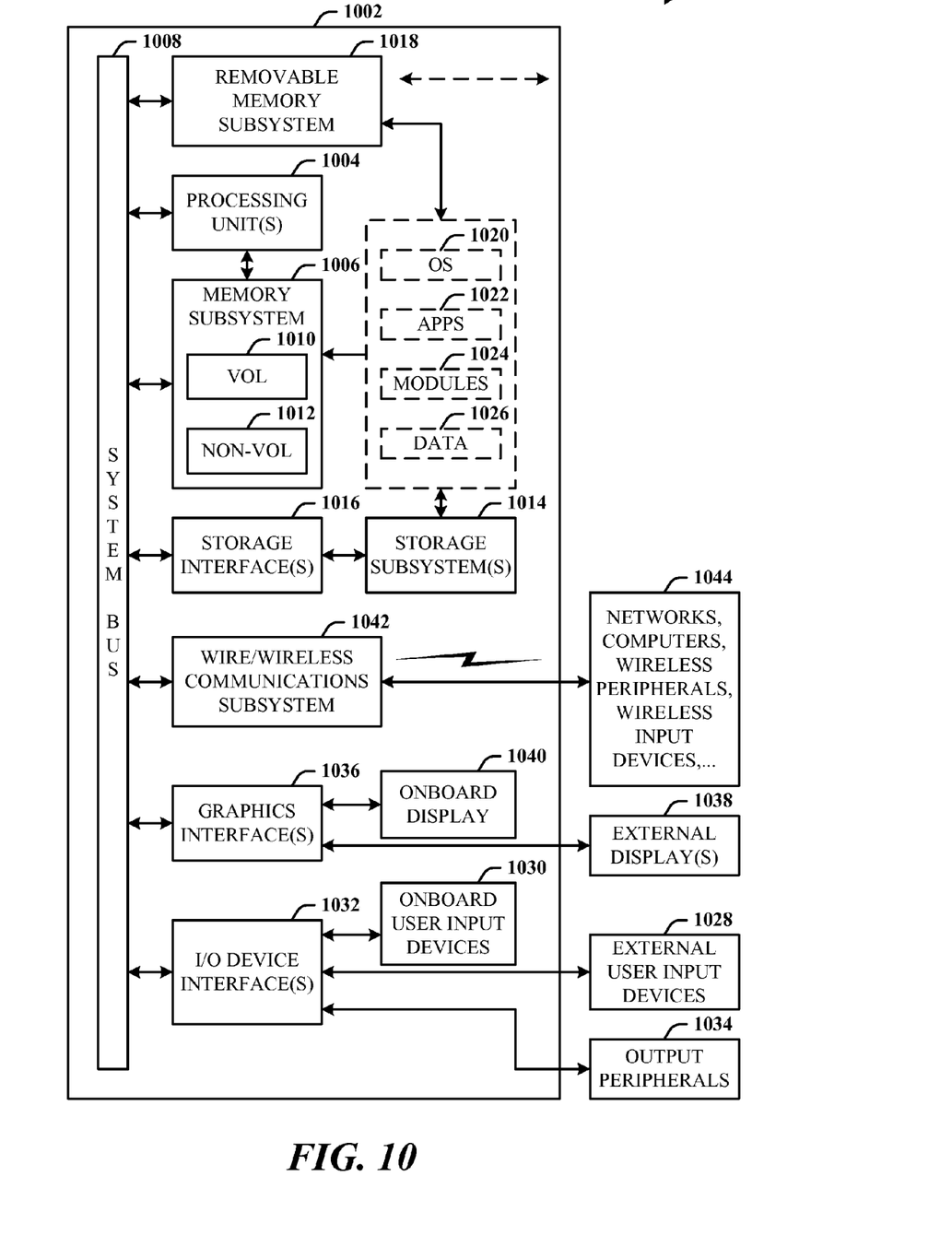
FIG. 10 illustrates a block diagram of a computing system that executes dynamic interface reduction in model checking in accordance with the disclosed architecture.

Referring now to FIG. 10, there is illustrated a block diagram of a computing system 1000 that executes dynamic interface reduction in model checking in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 10 and the following description are intended to provide a brief, general description of the suitable computing system 1000 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1000 for implementing various aspects includes the computer 1002 having processing unit(s) 1004, a computer-readable storage such as a system memory 1006, and a system bus 1008. The processing unit(s) 1004 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1006 can include computer-readable storage (physical storage media) such as a volatile (VOL) memory 1010 (e.g., random access memory (RAM)) and non-volatile memory (NON-VOL) 1012 (e.g., ROM, EPROM, EEPROM, etc.). A basic input/output system (BIOS) can be stored in the non-volatile memory 1012, and includes the basic routines that facilitate the communication of data and signals between components within the computer 1002, such as during startup. The volatile memory 1010 can also include a high-speed RAM such as static RAM for caching data.

The system bus 1008 provides an interface for system components including, but not limited to, the system memory 1006 to the processing unit(s) 1004. The system bus 1008 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1002 further includes machine readable storage subsystem(s) 1014 and storage interface(s) 1016 for interfacing the storage subsystem(s) 1014 to the system bus 1008 and other desired computer components. The storage subsystem(s) 1014 (physical storage media) can include one or more of a hard disk drive (HDD), a magnetic floppy disk drive (FDD), and/or optical disk storage drive (e.g., a CD-ROM drive DVD drive), for example. The storage interface(s) 1016 can include interface technologies such as EIDE, ATA, SATA, and IEEE 1394, for example.

One or more programs and data can be stored in the memory subsystem 1006, a machine readable and removable memory subsystem 1018 (e.g., flash drive form factor technology), and/or the storage subsystem(s) 1014 (e.g., optical, magnetic, solid state), including an operating system 1020, one or more application programs 1022, other program modules 1024, and program data 1026.

The operating system 1020, one or more application programs 1022, other program modules 1024, and/or program data 1026 can include the entities and components of the framework 100 of FIG. 1, the entities and components of the system 200 of FIG. 2, the layered architecture 300 of FIG. 3, the example traces (400, 500 and 600) of FIGS. 5-7, and the methods represented by the flowcharts of FIGS. 8 and 9, for example.

Generally, programs include routines, methods, data structures, other software components, etc., that perform particular tasks or implement particular abstract data types. All or portions of the operating system 1020, applications 1022, modules 1024, and/or data 1026 can also be cached in memory such as the volatile memory 1010, for example. It is to be appreciated that the disclosed architecture can be implemented with various commercially available operating systems or combinations of operating systems (e.g., as virtual machines).

The storage subsystem(s) 1014 and memory subsystems (1006 and 1018) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1002 and includes volatile and non-volatile internal and/or external media that is removable or non-removable. For the computer 1002, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1002, programs, and data using external user input devices 1028 such as a keyboard and a mouse. Other external user input devices 1028 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1002, programs, and data using onboard user input devices 1030 such a touchpad, microphone, keyboard, etc., where the computer 1002 is a portable computer, for example. These and other input devices are connected to the processing unit(s) 1004 through input/output (I/O) device interface(s) 1032 via the system bus 1008, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1032 also facilitate the use of output peripherals 1034 such as printers, audio devices, camera devices, and so on, such as a sound card and/or onboard audio processing capability.

One or more graphics interface(s) 1036 (also commonly referred to as a graphics processing unit (GPU)) provide graphics and video signals between the computer 1002 and external display(s) 1038 (e.g., LCD, plasma) and/or onboard displays 1040 (e.g., for portable computer). The graphics interface(s) 1036 can also be manufactured as part of the computer system board.

The computer 1002 can operate in a networked environment (e.g., IP-based) using logical connections via a wired/wireless communications subsystem 1042 to one or more networks and/or other computers. The other computers can include workstations, servers, routers, personal computers, microprocessor-based entertainment appliances, peer devices or other common network nodes, and typically include many or all of the elements described relative to the computer 1002. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1002 connects to the network via a wired/wireless communication subsystem 1042 (e.g., a network interface adapter, onboard transceiver subsystem, etc.) to communicate with wired/wireless networks, wired/wireless printers, wired/wireless input devices 1044, and so on. The computer 1002 can include a modem or other means for establishing communications over the network. In a networked environment, programs and data relative to the computer 1002 can be stored in the remote memory/storage device, as is associated with a distributed system. It will be appreciated that the network connections shown are exemplary and other means of establishing a communications link between the computers can be used.

The computer 1002 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented model checker framework, comprising:
    an exposure component that exposes underlying software components and associated well-defined interfaces of a target software system;
    an exploration component that dynamically performs state-space exploration of the target software system and dynamically discovers all interactions between underlying software components, wherein the exploration component discovers local state space and global state space concurrently, the exploration component includes a local explorer component and a global explorer component, the local explorer component reports newly discovered branching traces to the global explorer component, and the global explorer component discovers and projects new global traces to the local explorer component, wherein the exploration component performs interface equivalency in the local explorer component to check equivalency between branching traces to determine newness of a branching trace and performs interface equivalency in the global explorer component to check if prefixes of two traces are interface equivalent; and
    a processor that executes computer-executable instructions associated with at least one of the exposure component or the exploration component.

2. The framework of claim 1, wherein the exploration component discovers a local state space of each software component using a single-component simulation process, and the exploration component discovers a global state space of interactions between the software components using a composition-by-substitution process.

3. The framework of claim 1, further comprising a common data structure layer that provides an interface between the exploration component, and a component wrapper that defines component boundaries and interface transitions.

4. A computer-implemented model checker method, comprising acts of:
    exposing underlying software components and associated well-defined interfaces of a target software system;

performing interface equivalency to check equivalency between branching traces or a local skeleton to determine newness of a branching trace or local skeleton and to check if prefixes of traces are interface equivalent;

dynamically performing state-space exploration of the target software system to discover local state space for each software component as local explorations and interactions between the software components as global explorations, wherein performing state-space exploration comprises discovering local state space and global state space concurrently; and utilizing a processor that executes instructions stored in memory to perform at least one of the acts of exposing or performing.

5. The method of claim 4, further comprising dividing the target software system into a set of static components.

6. The method of claim 4, further comprising discovering and reporting newly discovered branching traces to a global explorer agent.

7. The method of claim 4, further comprising discovering and projecting new global traces to a local explorer agent.

8. The method of claim 4, wherein discovering local state space comprises using a single-component simulation process.

9. The method of claim 4, wherein discovering interactions between the software components comprises using a composition-by-substitution process.

10. The method of claim 4, wherein exposing underlying software components and associated well-defined interfaces comprises employing a model checker.

11. A computer-implemented model checker method comprising:

exposing underlying software components and associated interfaces of a target software system;

dynamically performing state-space exploration of the target software system to discover local state space for each software component as local explorations and to discover global state space for interactions between the software components as global explorations;

iteratively discovering local explorations and global explorations concurrently;

dividing the target software system into a set of static components;

performing interface equivalency in a local explorer component to check equivalency between branching traces to determine newness of a branching trace;

performing interface equivalency in a global explorer component to check if prefixes of traces are interface equivalent;

discovering new branching traces and new global traces;

reporting newly discovered branching traces to a global explorer agent; and reporting newly discovered global traces to a local explorer agent.

12. The method of claim 11, wherein dynamically performing state-space exploration of the target software system to discover local state space for each software component comprises dynamically performing state-space exploration of the target software system to discover local state space for each software component using a single-component simulation process.

13. The method of claim 11, wherein dynamically performing state-space exploration of the target software system to discover global state space for interactions between the software components comprises dynamically performing state-space exploration of the target software system to discover global state space for interactions between the software components using a composition-by-substitution process.

* * * * *